UNITED STATES PATENT OFFICE 3,005,852
Patented Oct. 24, 1961

3,005,852
PRODUCTION OF SULFOXIDES AND SULFONES
Harlan B. Freyermuth, Herman S. Schultz, and Saul R. Buc, Easton, Pa., assignors to General Aniline & Film Corporation, New York, N.Y., a corporation of Delaware
No Drawing. Filed Dec. 22, 1959, Ser. No. 861,209
16 Claims. (Cl. 260—607)

This invention relates to a method for producing sulfoxide- and sulfone-containing compounds, and more particularly to a process for the oxidation of organic compounds containing a sulfide linkage with hydrogen peroxide.

A number of oxidizing agents have been previously proposed and employed for the oxidation of organic sulfides to the corresponding sulfoxides and sulfones, including chlorine, sodium hypochlorite, sodium chlorate in HCl, and hydrogen peroxide alone or in glacial acetic acid, etc. Such processes have in general been plagued with a number of problems and disadvantages, including unduly long reaction times, unduly high reaction temperatures, unduly low yields, deterioration of the organic sulfide, contamination of the desired product by the by-products of oxidation, undue loss of oxidizing agent during the reaction due to decomposition, and undue dependence upon conditions of pH and the like. The oxidation of organic sulfides and sulfoxides containing hydroxyl groups has been particularly troublesome because of the sensitivity of such groups to simultaneous oxidation or, when hydrogen peroxide in glacial acetic acid is employed as oxidizing agent, to acetylation.

It is an object of this invention to provide a process for oxidizing an aromatic compound containing at least one nuclearly substituted HOC$_2$H$_4$S(CH$_2$)$_n$-group, $n$ being 1 or 0, to the corresponding sulfoxide and/or sulfone compound which will not be subject to the above disadvantages. Another object of this invention is the provision of a process for carrying out such oxidation with hydrogen peroxide which will not be subject to the above disadvantages. Still another object of this invention is the provision of an improved process for producing sulfone-containing compounds by reaction of an aromatic compound containing at least one nuclearly substituted

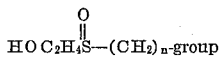

with hydrogen peroxide. Other objects and advantages will appear as the description proceeds.

The attainment of the above objects is made possible by this invention which is based upon the discovery that molybdic acids and their alkali metal, alkaline earth metal, ammonium and amine salts constitute a group of highly effective catalysts for the oxidation of hydroxyethylmercapto(methyl) and hydroxyethylsulfinyl(methyl)-containing compounds to the corresponding sulfoxides and/or sulfones. The use of any of such molybdic acid compounds to catalyze such oxidation has been unexpectedly found to enable the attainment of several advantages and improved results with respect to shortened reaction time, lower reaction temperatures, increased yields, decreased deterioration or side reaction of the compound being oxidized, decreased dependence on pH conditions and/or decreased loss of hydrogen peroxide due to decomposition and the like.

The invention accordingly comprises a process for producing sulfoxide- and sulfone-containing compounds comprising reacting one mole of an aromatic compound containing at least one nuclearly substituted HOC$_2$H$_4$S(CH$_2$)$_n$-group $n$ being 1 or 0, with from 1 to 2 moles of hydrogen peroxide for each such group in said compound, in the presence of a catalytic amount of a member of the group consisting of the molybdic acids and their alkali metal, alkaline earth metal, ammonium and amine salts.

The invention further comprises a process for producing sulfone-containing compounds comprising reacting one mole of an aromatic compound containing at least one nuclearly substituted

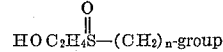

$n$ being 1 or 0, with one mole of hydrogen peroxide for each such group in said compound, in the presence of a catalytic amount of a member of the group consisting of the molybdic acids and their alkali metal, alkaline earth metal, ammonium and amine salts.

As stated above, any aromatic compound containing at least one nuclearly substituted hydroxyethylmercapto- or sulfinyl(methyl)-group may be treated in accordance with the process of the present invention. Broadly speaking, each such group is preferably joined to a phenyl radical, more preferably at least two of such groups being joined to a single phenyl radical, although it will be understood that such group or groups may be joined to any cyclic carbon atom, which atom may be part of a carbocycle or heterocycle which may contain any organic or inorganic substituents and may be fused to any number of other carbocyclic or heterocyclic rings which may be further substituted. As suitable substituents, there may be mentioned by way of example only, such groups as hydroxy, alkoxy, sulfoxy, sulfone, sulfonamide, nitrile, acyl and the like, in addition to inorganic groups including metals, etc.

Suitable carbocyclic or heterocyclic groups or compounds to which the above described mercapto- and sulfinyl-containing groups may be joined through a cyclic carbon atom include, for illustrative purposes only, phenyl, naphthyl, anthraquinonyl, anthronyl, benzanthronyl, azine, azole, quinolinyl, pyridyl, pyrrol, thioxanthene, thioxanthone, thiophene, xanthene, xanthone, furane, and the like. Desirably, such carbocycles and heterocycles constitute dyestuff moieties of any known type, whereby the products may be employed as intermediates in the production of sulfatoethylsulfonyl-containing dyestuffs regarded as being reactive with textile fibers and the like.

In carrying out the reaction, it is preferred to employ an aqueous medium although in some instances a water miscible organic solvent for the starting intermediate may be employed as the reaction medium or as a mutual solvent in the aqueous medium for solubilizing purposes. As examples of such solvents, there may be mentioned methanol, ethanol, butanol, Cellosolves (lower alkyl and benzyl ethers of ethylene glycol), Carbitols (lower alkyl ethers of diethylene glycol), dioxane, acetone, methyl ethyl ketone, and the like. The reaction may be carried out at any temperature ranging from the freezing point to the boiling point of the medium although elevated temperatures of about 50° to 80° or 90° C. are preferred in most instances to accelerate the reaction. It is one of the advantages of this process that it may be carried out at lower temperatures than required in the absence of the present catalysts, and that even at the same temperatures, much shorter reaction times are made possible whereby deterioration of starting intermediate, oxidizing agent and the like is minimized.

The amount of hydrogen peroxide theoretically required to produce the sulfoxide or sulfone from the sulfide, or the sulfone from the sulfoxide, may be added at the start of the reaction or may be added gradually as the reaction proceeds. Starting with the sulfide, the reaction proceeds in two stages, in the first of which the sulfide is oxidized to the sulfoxide and in the second of which the sulfoxide is oxidized to the sulfone. The first stage of the reaction proceeds readily and is exothermic in nature whereby the temperature of the reaction medium rises without introduction of heat, in some instances to the boiling point. Cooling is often required to prevent the temperature from rising to a point detrimental to the reaction or to the chemical structure of the intermediate and final compound. The reaction medium may be homogeneous or heterogeneous, and in the form of a solution, dispersion or emulsion. The sulfoxide derivative is usually more soluble in water than either the sulfide or sulfone so that in many cases the sulfoxide is in solution in aqueous medium during the oxidation with hydrogen peroxide and may be isolated by cooling the aqueous solution or salting and/or extracting with appropriate solvents and/or separating layers and/or filtering off solid products.

One molecule of hydrogen peroxide theoretically is required to oxidize the divalent sulfur atom in each hydroxyethylmercapto group in the starting compound to the corresponding sulfoxide, and another molecule of hydrogen peroxide required to oxidize the sulfoxide group to the sulfone. It is another advantage of this process that only substantially theoretical proportions are needed, although an excess of the hydrogen peroxide may be employed if so desired. This is made possible by the accelerated rate of reaction and/or lowered reaction temperatures necessary in the present process. For similar reasons, the reaction medium may be maintained at any desired pH ranging from about 1 to 10 or 11 and preferably 5 to 7, even though alkaline conditions are normally detrimental to the stability of the hydrogen peroxide.

The oxidation of the sulfoxide to the sulfone is generally more difficult than the oxidation of the sulfide to the sulfoxide and may require more elevated temperatures and/or longer reaction times. In any case, the reaction to either the sulfoxide or the sulfone stage may be followed by testing for unreacted hydrogen peroxide with starch-iodide paper as the reaction proceeds. A negative testing indicates an absence of unreacted hydrogen peroxide indicating the reaction to be completed if the theoretical amount of hydrogen peroxide has been employed.

The hydrogen peroxide is preferably added in the form of the commercially available 30 to 31% aqueous solution although it may be added in any other form, e.g. from 5 to 100% concentration. To minimize loss due to decomposition of the hydrogen peroxide it is in some instances preferred to maintain the pH of the reaction medium in the neutral or acid range and/or to add the hydrogen peroxide at a rate about equal to its rate of consumption in the reaction. It will be understood that the process may be carried out by batch, intermittent or continuous methods. Any excess of hydrogen peroxide remaining after completion of the reaction may be removed by a brief reflux or by addition of a small, equivalent amount of sodium bisulfite.

The catalyst employed in the present process is a molybdic acid or a salt thereof, neutral or acid. Molybdic acid or sodium or ammonium molybdate are preferred, but any other molybdic acid or alkali metal, alkaline earth metal, ammonium or amine salt thereof may be employed. Homopolymolybdic and heteropolymolybdic acids may be employed, as for example, those of boromolybdic acid, phosphomolybdic acid, bismomolybdic acid, selenomolybdic acid, and the like.

Salts of any of these molybdic acids with sodium, potassium, lithium, calcium, barium, magnesium, ammonium, mono-, di-, and tri-ethanol-, -propanol-, -methyl-, -ethyl-, and -propyl-amines, cyclohexylamine, morpholine, pyridine, picoline, and the like may be employed. The catalyst may also be formed in the reaction medium by addition of molybdic oxide. The catalytic amount of such molybdic acid compounds required to achieve the desired results will in any particular instance be readily ascertainable by the person skilled in the art operating the process. In general, such amounts may range from about 0.001% to 10% by weight of the compound being oxidized, although amounts outside this range may be operative. Generally, 0.1 to 1% of the catalyst will be sufficient.

The mechanism by which the unexpectedly improved results of this process are obtained is not clearly understood although it is postulated, without of course being limited thereto, that the oxidation is actually effectuated by the action of the peroxyacid of the highest oxidation state of the molybdic acid which is continuously regenerated by the hydrogen peroxide.

As a further feature of this invention it has been found that further improved results are obtainable by inclusion in the reaction medium of a small amount of sequestering agent, for example from about 0.001 to 5% in the medium. This further improvement is based upon the discovery that small and even trace amounts of copper, chromium, iron and certain other metals catalyze the decomposition of hydrogen peroxide and/or other side reactions detrimental to the progress of the desired reaction. Such detrimental effects of these metal impurities is much more pronounced when the oxidations are carried out over an extended period of time such as 10 to 24 hours and/or at higher temperatures in the absence of the present catalytic substances. Although the use of these catalysts minimizes such undesirable decomposition and side reactions, optimum results in commercial use may in some instances be obtained by the addition of such sequestering agent. Ethylenediamine tetraacetic acid and other aminopolycarboxylic, and polyaminopolycarboxylic acids and their salts, preferably the alkali metal (sodium, potassium) salts, are preferred for use herein. However, these and other known sequestering agents for such metals may be used such as β-hydroxyethyl ethylene diamine triacetic acid, triethanolamine, citric acid, bis-N(β-hydroxyethyl) glycine, gluconic acid, tartaric acid.

The usefulness of the improved process of this invention for carrying out oxidation of nuclearly substituted hydroxyethylmercapto- and sulfinyl(methyl)-containing aromatic compounds has been pointed out above. It will be understood that the products of such oxidation processes are suitable for a number of different known uses. In general, the sulfoxide and sulfone derivatives obtained by the present process are useful in a variety of applications such as dyestuff intermediates, dyestuffs, textile finishes, ultraviolet absorbers, photographic or photosensitive intermediates, water repellants, antibiotic substances, pharmaceuticals, polymer intermediates (monomers), and the like. By way of example, the process of this invention may be employed as a step in the production of compounds containing a sulfatoethylsulfone group as disclosed in U.S. 2,670,265. Such compounds are reactive with fibrous materials acting to impart to the fibrous material any desired effect depending on the structure of the compound containing the sulfatoethylsulfone group. In this manner, improvements may be obtained in dyeing, crease-proofing, moth-proofing, immunizing, waterproofing or water repellentizing, etc.

The following examples are only illustrative of the instant invention and are not to be regarded as limitative. All parts and proportions referred to herein and in the appended claims are by weight unless otherwise indicated.

Example 1

0.2 part of molybdic acid is slurried with 75 parts water, and the pH raised to 12.0 by addition of 50% NaOH. After 5 minutes stirring, the pH is lowered to about 5.0 by the dropwise addition of glacial acetic acid. 31.7 parts of 5-nitro-2-methyl-m-xylylene-$\alpha^1,\alpha^3$-bis(mercaptoethanol) are added to the catalyst solution and the mixture heated to 60-65° C. 21.9 parts 31% hydrogen peroxide are added gradually over a one-half hour period. The temperature is maintained at 60-65° C. by cooling with a cold water bath. The suspension of bis-sulfide goes into solution as it is oxidized to the bis-sulfoxide, and at the end of the addition of peroxide a homogeneous system exists. After five minutes stirring the reaction mixture gives a negative hydrogen peroxide test on starch-potassium iodide paper. The temperature of the reaction mixture is raised to 65-70° C. and 24.1 parts 31% hydrogen peroxide are gradually added during a one-half hour period and the temperature maintained at 70-75° C. by cooling. During the addition of the second portion of peroxide, the bis-sulfone is formed and precipitates out. The reaction mixture is refluxed for one-half hour, then cooled to room temperature. The product is filtered, washed with water and dried in a vacuum oven at 85° C. The 5-nitro-2-methyl-m-xylylene-$\alpha^1,\alpha^3$-bis(sulfonylethanol) product, melting at 193-194° C., is obtained in a 92% yield. The product has the following structure:

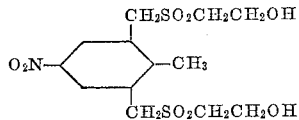

The bis-mercaptoethanol intermediate subjected to oxidation in this example is prepared by bis-chloromethylation of p-nitro toluene and reaction of the bis-chloromethylated compound with mercaptoethanol.

Example 2

(For comparison, without catalyst)

31.7 parts of 5-nitro-2-methyl-m-xylylene-$\alpha^1,\alpha^3$-bis(mercaptoethanol)=0.10 mole are added to 75 parts of water of pH 6.0 and the mixture heated to 60° C. There is then added in 32 minutes, 20.6 parts per volume of 30% hydrogen peroxide. After 13.5 parts per volume have been added the mixture is a clear solution. The solution is heated to reflux and there is then added in 10 minutes, 23.2 parts per volume of 30% hydrogen peroxide. The solution becomes lighter. A positive test for hydrogen peroxide stays after 3 hours at reflux. Let cool and stand overnight. Filter and wash with a little ice water. Yield=21.60 g. dry product=56.6% theory, M.P.=168-170° C. The product has the same structure as that of Example 1.

Example 3

The procedure of Example 1 is repeated except that 12 parts of tetrasodium ethylenediamine tetraacetate solution (.0375 g./ml.) are added to the catalyst solution. The same product is obtained in 94% yield.

Example 4

The procedure of Example 1 is repeated except that 10 parts tetrasodium ethylenediamine tetraacetate solution (.0375 g./ml.) and 24.3 parts 2-(2-nitro-o-anisyl-$\alpha^1$-mercapto)ethanol are added to the catalyst solution instead of the bis-(mercaptoethanol). The product has a melting point of 130-132° C. obtained in 86.0% yield. Its structure is

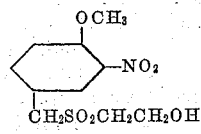

The mercaptoethanol intermediate subjected to oxidation in this example is prepared by monochloromethylation of o-nitroanisole and reaction of the chloromethylated compound with mercaptoethanol.

Example 5

The procedure of Example 1 is repeated except that 10 parts tetrasodium ethylenediamine tetraacetate solution (.0375 g./ml.) and 24.3 parts 2-(4-nitro-o-anisyl-$\alpha^1$-mercapto)ethanol are added to the catalyst solution instead of the bis-(mercaptoethanol). The product has the structure:

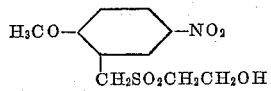

Example 6

0.2 part molybdic acid ($H_2MoO_4 \cdot H_2O$) is slurried with 65 parts distilled water. The pH is raised to 11.6 by the addition of 50% sodium hydroxide solution, and 10 parts tetrasodium ethylenediamine tetraacetate (.0375 g./ml.) solution are added. After stirring five minutes the pH is lowered to 6.0 by the addition of glacial acetic acid. 36.6 parts of thiodiglycol are added to the catalyst solution and the mixture heated to 60-65° C. 32.8 parts 31% hydrogen peroxide are added over a one-half hour period. The temperature is maintained at 60-65° C. with a cold water bath. 32.8 parts 31% hydrogen peroxide, the second half of the required amount, are added at 60-65° C. over a one-half hour period. The solution gives a positive test for hydrogen peroxide on starch-potassium iodide paper. The reaction mixture is heated to 100° C. for five minutes, at which time there is obtained a negative test for hydrogen peroxide on starch iodide paper. Wt. of solution=175 g.=26.4% solution of diethanolsulfone.

Example 7

(For comparison, without catalyst)

36.6 parts thiodiglycol are added to 75 parts distilled water and the solution heated to 90-95° C. 32.8 parts (one-half required amount) of 31% hydrogen peroxide are added over a one-half hour period at the same temperature. A negative test for hydrogen peroxide on starch-potassium iodide paper is obtained. Upon adding 11.16 parts of the second half of hydrogen peroxide, a strong positive test for hydrogen peroxide is obtained on starch iodide paper. The reaction does not use up 34% of the required amount of the second portion of hydrogen peroxide in the time required to complete a catalyzed reaction as in Example 6.

This invention has been disclosed with respect to certain preferred embodiments and various modifications and variations thereof will become obvious to the person skilled in the art. It is to be understood that such modifications and variations are to be included within the spirit and scope of this invention.

We claim:

1. A process for producing sulfoxide- and sulfone-containing compounds comprising reacting one mole of an aromatic compound containing at least one nuclearly substituted $HOC_2H_4S(CH_2)_n$-group wherein $n$ is one of the integers 0 and 1, with from 1 to 2 moles of hydrogen peroxide for each such group in said compound in the presence of a catalytic amount of a member of the group consisting of the molybdic acids and their alkali metal, alkaline earth metal, ammonium and amine salts.

2. A process as defined in claim 1 carried out at a temperature of about 50° to 80° C.

3. A process as defined in claim 1 wherein a catalytic amount of sodium molybdate is employed.

4. A process as defined in claim 1 wherein a catalytic amount of molybdic acid is employed.

5. A process as defined in claim 1 carried out in the presence of a sequestering agent.

6. A process as defined in claim 5 wherein the sequestering agent is tetrasodium ethylenediamine tetraacetate.

7. A process for producing sulfone-containing compounds comprising reacting one mole of an aromatic compound containing at least one nuclearly substituted

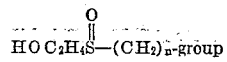
$$HOC_2H_4\overset{O}{\underset{\parallel}{S}}-(CH_2)_n\text{-group}$$

wherein $n$ is one of the integers 0 and 1, with one mole of hydrogen peroxide for each such group in said compound, in the presence of a catalytic amount of a member of the group consisting of the molybdic acids and their alkali metal, alkaline earth metal, ammonium and amine salts.

8. A process as defined in claim 7 carried out at a temperature of about 50° to 80° C.

9. A process as defined in claim 7 wherein a catalytic amount of sodium molybdate is employed.

10. A process as defined in claim 7 wherein a catalytic amount of molybdic acid is employed.

11. A process as defined in claim 7 carried out in the presence of a sequestering agent.

12. A process as defined in claim 11 wherein the sequestering agent is tetrasodium ethylenediamine tetraacetate.

13. A process for producing 5-nitro-2-methyl-m-xylylene-$\alpha^1,\alpha^3$-bis(2-sulfonylethanol) comprising reacting one mole of 5-nitro-2-methyl-m-xylylene-$\alpha^1,\alpha^3$-bis(2-mercaptoethanol) with 4 moles of hydrogen peroxide in the presence of a catalytic amount of a member of the group consisting of the molybdic acids and their alkali metal, alkaline earth metal, ammonium and amine salts.

14. A process as defined in claim 13 carried out in the presence of a sequestering agent.

15. A process for producing diethanolsulfone comprising reacting one mole of thiodiglycol with 2 moles of a catalytic amount of a member of the group consisting of the molybdic acids and their alkali metal, alkaline earth metal, ammonium and amine salts.

16. A process as defined in claim 15 carried out in the presence of a sequestering agent.

No references cited.

UNITED STATES PATENT OFFICE
CERTIFICATE OF CORRECTION

Patent No. 3,005,852                        October 24, 1961

Harlan B. Freyermuth et al.

It is hereby certified that error appears in the above numbered patent requiring correction and that the said Letters Patent should read as corrected below.

Column 8, line 18, after "2 moles of" insert -- hydrogen peroxide in the presence of --.

Signed and sealed this 19th day of June 1962.

(SEAL)
Attest:

ERNEST W. SWIDER
Attesting Officer

DAVID L. LADD
Commissioner of Patents